United States Patent [19]
Irwin et al.

[11] Patent Number: 6,046,674
[45] Date of Patent: Apr. 4, 2000

[54] MULTI-STATION RF THERMOMETER AND ALARM SYSTEM

[75] Inventors: Michael Bruce Christopher Irwin, Pembroke; Kevin Bailey, Ottawa, both of Canada; Troy Gene Anderson, Marblehead, Mass.; Rudy Anthony Vandenbelt, Ottawa, Canada

[73] Assignee: Headwaters Research & Development, Inc., Ottawa, Canada

[21] Appl. No.: 08/968,290

[22] Filed: Nov. 12, 1997

[51] Int. Cl.⁷ ..................................................... G08B 1/08
[52] U.S. Cl. .......................... 340/539; 340/506; 340/511; 340/586; 340/601
[58] Field of Search ...................................... 340/506, 511, 340/524, 525, 586, 534, 596, 693.3, 825.06, 825.08, 825.58, 601

[56] References Cited

U.S. PATENT DOCUMENTS

| | | | |
|---|---|---|---|
| 4,608,565 | 8/1986 | Sakamoto | 340/870.17 |
| 5,381,136 | 1/1995 | Powers et al. | 340/539 |
| 5,907,279 | 5/1999 | Bruins et al. | 340/506 |

OTHER PUBLICATIONS

Model IOTA 1 & Model IOTA 2 Digital Indoor/Outdoor Thermometers; Trend Industries Product Brochure; Jun. 10, 1997.

Electronic Weather Station With Alarm Clock; Cathay Pacific Product Brochure; undated.

Model 7055 Wireless Weather Station with Radio Controlled Clock; Europe Supplies Product Brochure; undated.

*Primary Examiner*—Daryl Pope
*Attorney, Agent, or Firm*—Albert Peter Durigon

[57] ABSTRACT

A multi-station RF thermometer and alarm system measures temperatures at remote locations by RF thermometers, and displays received temperature telemetry on a multi-station base station that provides out-of-bounds alarm signal indications whenever temperatures are outside of user-selectable minimum and maximum values. Randomized transmission times lessen the possibility of on-going collisions between two or more transmitters contending for the base station at the same time. Redundant data transmission lessens the possibility of environmental noise interference. The redundant data transmitted at random times includes a unique channel ID code, house-keeping data, the current temperature and/or time-to-next-transmission data. The temperature sensing transmitters operate at a low duty cycle with low peak current consumption resulting in long battery life. The multi-station base station may be AC- or battery-powered. Channel and station ID switches are provided on the remote temperature sensing transmitters and on the multi-station base station.

26 Claims, 11 Drawing Sheets

MULTI-STATION RF THERMOMETER AND ALARM SYSTEM

FIELD OF THE INVENTION

This invention is drawn to the field of telemetry, and more particularly, to a novel multi-station RF thermometer and alarm system.

BACKGROUND OF THE INVENTION

Many of life's activities are heavily influenced by the temperature. Heretofore, hard-wired digital thermometers, such as the model IOTA1 and the model IOTA2 commercially available from TREND Industries, Inc., or the Electronic Weather Station With Alarm Clock, commercially available from CATHAY PACIFIC, measure temperature by a hard-wired probe, and display the measured temperature on an associated display. Such hard-wired digital thermometers, however, need to be placed within inches or feet of the environment to be measured. This can be inconvenient, as this type of digital thermometer is not placed where it is most accessible and likely to be needed (e.g., next to a bed, on a desk, etc.), but where it must be placed to work.

Wireless (RF) digital thermometers, such as the model "7055" Wireless Weather Station With Radio Controlled Clock, commercially available from Europe Supplies, Ltd., measure temperature by a remote wireless temperature station and display the measured temperature on a display associated with a base station. Although in principle such transmitters may be remotely located to the base, environmental noise sources have generally limited their practical range and have given rise to erroneous telemetry and lack of operator confidence. And if more than one location needs to be monitored, another such RF transmitter and base pair needs to be provided for every location to be measured. Not only has this resulted in increased overall costs, and undesirable multiplication of base stations, but the utility of such transmitter/base pairs has further been limited by contention-induced interference as transmissions from the multiple transmitters collide at each base station.

Moreover, both the hard-wired and RF temperature thermometers heretofore have had their utility limited by probe placement difficulties, whenever locations that are other than directly exposed and in the open are to be monitored.

SUMMARY OF THE INVENTION

Accordingly, it is an object of the present invention to disclose a multi-station RF thermometer and alarm system suitable for home, office and light industrial use.

It is another object of the present invention to disclose a multi-station RF thermometer and alarm system that provides temperature monitoring of plural remote locations and at a local base station.

It is another object of the present invention to disclose a multi-station RF thermometer and alarm station that provides reliable temperature transmission and reception in the presence of interference (environmental noise interference and contention-induced interference).

It is another object of the present invention to disclose a multi-station RF thermometer and alarm system that provides user-setable alarm limits for each of multiple remote and/or local locations and that provides alarm signals whenever out-of-bounds conditions prevail at any location.

It is another object of the present invention to disclose a multi-station RF thermometer and alarm system that provides accurate temperature sensing and transmission over wide temperature and distance ranges in a manner that requires low power consumption suitable for long-life battery operation.

In accord therewith, the disclosed multi-station RF thermometer and alarm system of the present invention includes at least one portable, battery-powered temperature station and a multi-station base station. Each of the at least one portable, battery-powered temperature stations provides, as desired, measurement of temperatures in rooms, refrigeration devices, pools, outdoor areas, etc., and the multi-station base station, which may be placed on a desk, at bedside, or otherwise as convenient, receives and displays, preferably concurrently, the measured temperature data received from the one or more portable, battery-powered temperature stations and measured at the multi-station base station.

In the preferred embodiment, each temperature station transmits remote temperature measurements over a two-hundred and fifty foot (250') range to the multi-station base station and is operable over an active indoor/outdoor temperature range from minus forty degrees $(-40)°$ F. to one hundred and fifty eight degrees $(158)°$ F. In the preferred embodiment, the multi-station base station receives and displays temperature from up to four (4) remote transmitters.

Accordingly to one aspect of the present invention, the portable, battery-powered temperature station includes an analog temperature sensor providing a temperature signal representative of sensed temperature; an antenna; and a processor-controlled transmitter coupled to the antenna and to the temperature signal operative (1) to periodically convert the temperature signal to a digital representation of the sensed temperature, (2) to digitally encode a data frame having first information representative of the sensed temperature and second information representative of station ID, and (3) to transmit a predetermined integral number greater than one (1) of data frames each having said first and said second information at a random time. The randomized transmission times, and redundantly encoded temperature and transmitter ID data, cooperate to alleviate collision-induced contention and to provide reliable data transmission in noisy environments. In the preferred embodiment, the temperature data is read every thirty (30) seconds and five (S) redundant data frames are randomly transmitted once every thirty (30) to sixty (60) seconds.

Accordingly to a further aspect of the present invention, the portable, battery-powered temperature station includes an analog temperature sensor providing a temperature signal representative of sensed temperature; an antenna; and a processor-controlled transmitter coupled to the antenna and to the temperature signal operative (1) to periodically convert the temperature signal to a digital representation of the sensed temperature, (2) to generate a schedule of present and future random transmission times, (3) to digitally encode a data frame having first information representative of the sensed temperature, second information representative of station ID, and third information representative of the schedule of present and future random transmission times and (4) to transmit a predetermined integral number of data frames each having said first, said second and said third information at a random time. The schedule of present and future random transmission times allows the multi-station base station to "sleep" at times when no transmissions are scheduled, or when previous transmissions indicate very little temperature change, thereby conserving power enabling long-life battery-powered base station operation.

According to another aspect of the present invention, the disclosed portable, battery-powered temperature station includes a housing; a waterproof probe electrically connected to the housing via an elongated flexible cable of predetermined length; an attachment member for stowing the probe to the housing when not in use; and means for paying out any selected length of the elongated flexible cable of predetermined length selected to accommodate the needs of each particular application. In the preferred embodiment, the housing includes a front wall and a battery receiving compartment, and the attachment member includes a well formed in the front wall of the housing dimensioned to frictionally receive the probe. The pay-out means includes a wire-receiving chamber provided in the battery compartment of the housing. The selectably extendable probe enables to measure hard-to-reach areas, such as the water temperature of an outdoor pool or the inside temperature of a storage freezer.

According to another aspect of the present invention, the disclosed multi-station base station includes a multi-field reconfigurable display; operator input means; a receiver for providing an output signal in response to transmissions received from each at least one portable, battery-powered temperature station; and a processor coupled to the display, to the input means, and to the receiver, that is operative in a decode/display mode, an alarm set mode, and an alarm announce mode.

In the decode/display mode, the processor is operative (1) to configure the display with a field that corresponds to each of multiple temperature station zones, (2) to recover from the output signal of the receiver the first information representative of sensed temperature and the second information representative of the transmitting station ID for each data frame of the redundantly transmitted data frames, and (3) to display the recovered temperature data in a field corresponding to an identified station if the first information representative of the sensed temperature of two (2) of the redundantly transmitted data frames conform to each other for a given station.

In the preferred embodiment, the display is configured with a comparatively-large "active" location field, with five (5) temperature station fields (four (4) remote station and one (1) base station fields), and with temperature high and low fields, and the processor is operative in the decode/display mode to display the current temperature of any temperature station in the comparatively large "active" location field and the daily high and low temperatures in the corresponding high and low temperature fields in response to operator input station selection, and to concurrently display the temperature at any active locations (remote and/or base) in the corresponding ones of the five (5) temperature station fields. Other display configurations, such as concurrent and/or sequential display of less than all of the active locations, and operator input station display selection, could be employed.

In the alarm set mode, the processor is operative to configure the display with alarm min and alarm max fields and with at least one alarm set station field, and is operative in response to operator input station (base or remote) selection, in response to operator input alarm min and max values selection and in response to operator input alarm arming to set and to display min and max temperature bounds for each station selected and armed. Min/max setpoints for temperature range may be set for all locations. If the temperature in any location goes outside this set range, an alarm (visible, audible and/or remote) signal indication is provided in alarm announce mode. In the preferred embodiment, all stations that have been armed are concurrently displayed, although sequential display in response to operator input station display selection could be employed.

In alarm announce mode, the processor is operative to configure the display with an alarm announce icon field and at least one active alarm station field, and is operative (1) to display a location where an active alarm condition exists in the active alarm station field, (2) to provide an alarm signal indication, and (3) is operative in response to operator alarm dis-arm input to clear the alarm condition for each alarm location. The alarm signal may be an audible, a visible, and/or a remote alarm signal. In the preferred embodiment, all stations that have active alarm conditions are concurrently displayed, although sequential display in response to operator input station display selection could be employed.

In one embodiment, the multi-station base station is AC outlet powered, and in another embodiment, it is battery-powered.

BRIEF DESCRIPTION OF THE DRAWINGS

These and other objects, inventive aspects, and advantageous features will become apparent as the invention becomes better understood by referring to the following detailed description of the presently preferred embodiments, and to the drawings, wherein.

DETAILED DESCRIPTION OF THE PRESENTLY PREFERRED EMBODIMENTS

Figure 1:
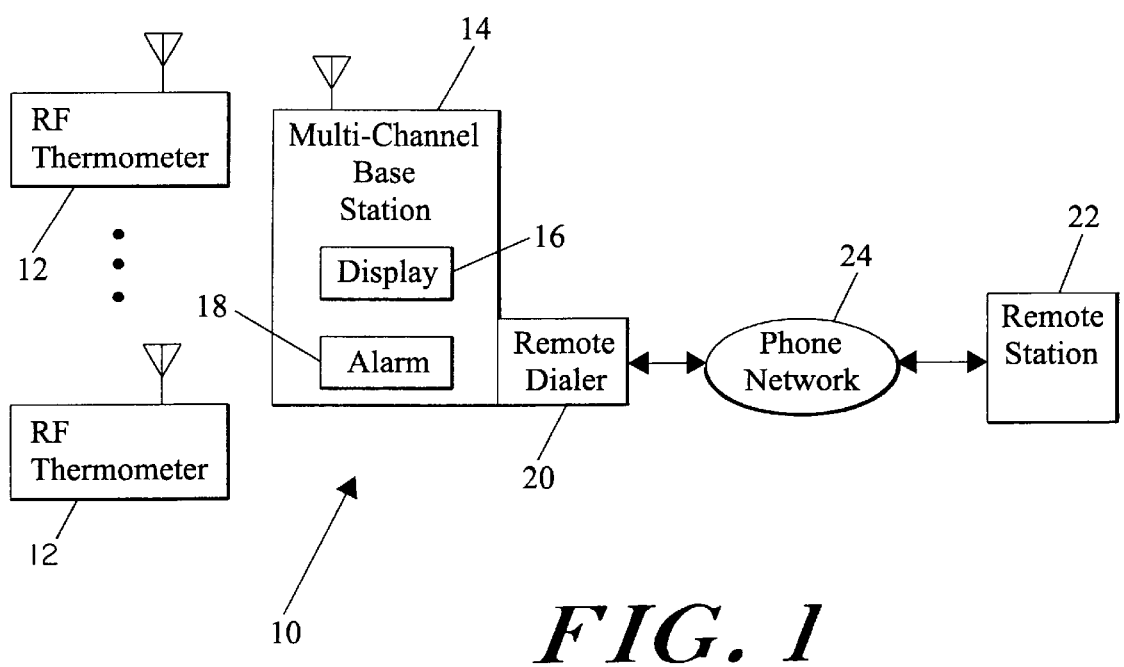
FIG. 1 is a functional block diagram of the multi-station RF thermometer and alarm system of the present invention.

Referring now to FIG. 1, generally designated at 10 is a functional block diagram of the multi-station RF thermometer and alarm system in accord with the present invention. The system 10 includes a plurality of RF thermometers 12 to be described and a multichannel base station 14 in spaced apart relation to the plural RF thermometers 12. The system 10 is adapted for home, office and light industrial use. The RF thermometers 12 are portable, battery-powered devices that may be placed anywhere where temperatures are to be monitored. For example, one temperature transmitter 12 could be attached to the back of the house, another in the pool, a third in a green house, and a fourth in the garden, all not shown.

The multi-channel base station 14 includes a receiver, not shown, to be described that receives the temperatures transmitted by the plural RF thermometers 12 and displays temperature data received from the plural RF thermometers 12 on display 16. The multichannel base station 14 also displays the temperature at the base station by means of the display 16. In the presently preferred embodiment, the display 16 displays the temperature at the base station 14, as well as the temperatures at each of the remote RF thermometers 12, concurrently. Other temperature display methodologies, such as sequential display of the temperatures at plural remote and base station locations may be employed.

The multichannel base station 14 monitors the temperature data received from each of the plural remote RF thermometers 12 and the base station 14 compares the received temperatures and the base station temperature to user-setable alarm limits to be described for each remote location and the base station. In the preferred embodiment, the alarm limits are minimum and maximum limits independently user setable for each location (base and remote). If the received temperatures and the local base station temperature are out of the bounds set by the alarm limits for any location, the multichannel base station 14 provides an alarm as schematically illustrated by box 18. The alarm 18 in the preferred embodiment includes an audible and a visible alarm signal.

A remote dialer 20 is connected to the multichannel base station 14. The remote dialer 20 is connected to a remote station 22 via the phone network 24. The remote dialer 20 sends all temperature data to the remote display 22 at preset times, or when alarm conditions exist at any location.

The remote station 22 receives and displays all temperature data sent by the remote dialer 22. The remote station 22 may dial the remote dialer 20 via the phone network 24 to request the current temperature data for any location, as well as the corresponding alarm limits.

The remote station 22 preferably includes a DTMF generator and a DTMF listener, not shown, that cooperate to send control information via the phone lines, and to receive data back from the multi-station base station in accord with the control information sent. The remote user into this way may, for example, request the current temperature information from all stations (remote and base) from the multi-station base station.

To manage interference (contention-based interference arising from the plural RF thermometers competing with the multichannel base station as well as noise interference arising in the intended operating environment), the multi-station RF thermometer and alarm system 10 of the present invention employs four (4) principal measures. First, each RF thermometer 12 and the multichannel base station 14 are provided with dual, user selectable channels "A" and "B" to be described. For example, interference from another multi-station RF thermometer and alarm system operating in the same locale may be eliminated by switching from one to the other of the two (2) channels. Second, each RF thermometer 12 transmits its temperature data at random times, preferably once every thirty (30) to sixty (60) seconds. The randomness of the transmissions makes it statistically unlikely that temperature data from multiple RF thermometers arrive simultaneously at the multichannel base station 14. Third, each RF thermometer 12 transmits redundant temperature and station ID information. Should environmental noise sources corrupt part of the telemetry, the multichannel base station 14 would be able to recover any uncorrupted part thereof. Fourth, the multichannel base station 14 maintains a record of time of receipt for each RF thermometer 12 data transmission and updates temperature data received from the plural RF thermometers 12 provided the same is received within a predetermined time window. So long as the temperature data from each channel (station) is received within the predetermined time window, preferably fifteen (15) minutes, from the time of last receipt, the multichannel base station updates the temperature information it maintains for each channel. Otherwise, it provides an indication of an inoperable channel. The fifteen minute channel recovery window should be sufficient for most noisy environments, although a different duration window could be employed.

Figure 2:
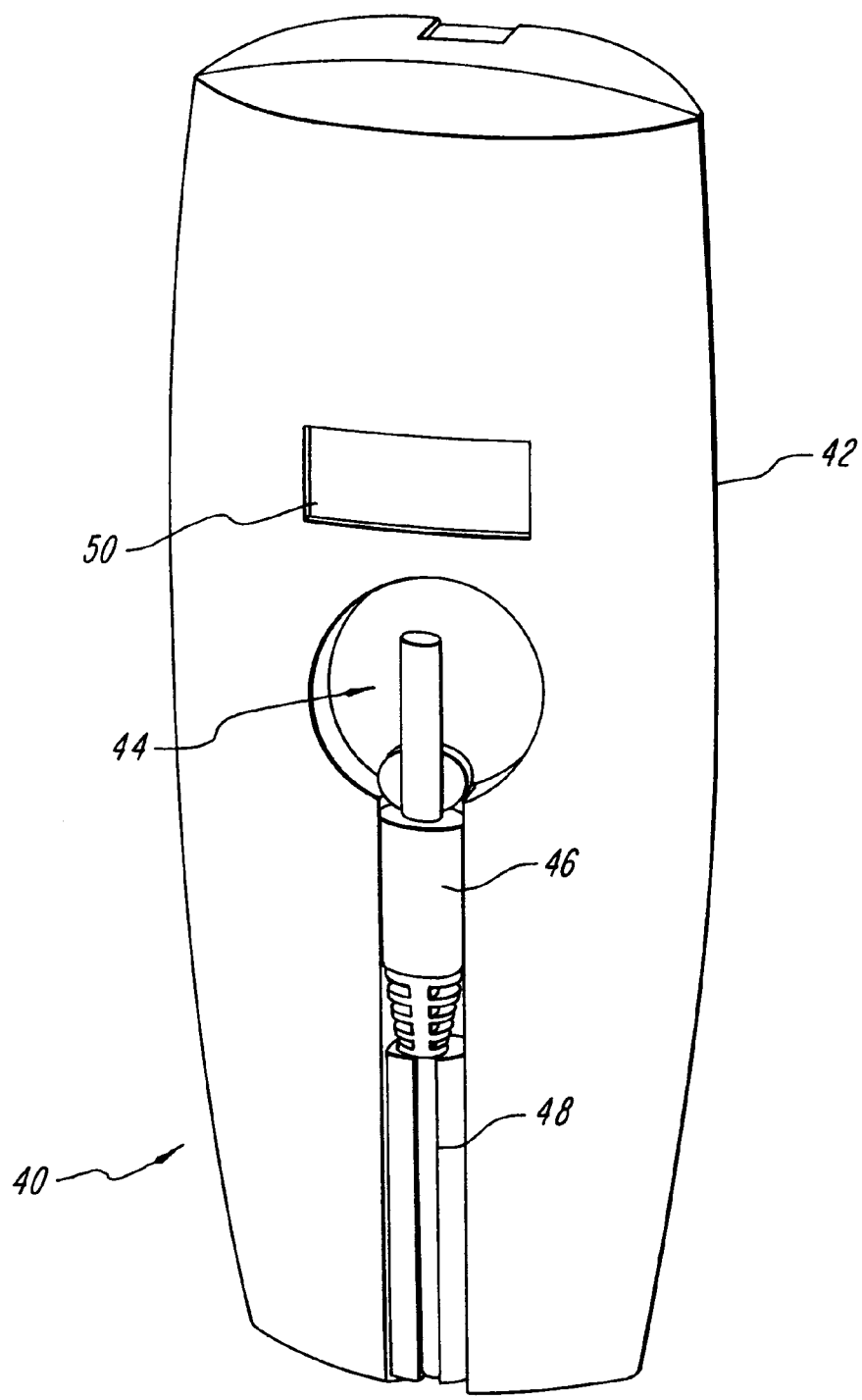
FIG. 2 is an elevational view of the front of the portable, battery-powered temperature station of the present invention.

Referring now to FIG. 2, generally designated at 40 is an elevational view of the front of the RF thermometer of the multi-station RF thermometer and alarm system of the present invention. The RF thermometer 40 includes a water-resistant housing 42 having O-ring seals, not shown, a well generally designated 44 integrally formed in the housing 42 for receiving a temperature probe, and a waterproof temperature probe 46 shown received in the probe receiving well 44. The waterproof probe 46 is connected to the housing 42 via an elongated flexible cable 48 of predetermined length, preferably ninety (90) centimeters. A display 50 for displaying the temperature sensed by the probe 46 is mounted to the housing 42. The RF thermometer 40 is battery-powered, is operational from minus fifty (−50) to plus seventy (+70) ° C., has a range of sixty (60) meters obstructed (i.e. through walls), an accuracy of +/−0.5° C. and a minus forty (−40) to a plus forty (+40) ° C. range for reliable temperature measurement.

Figure 3:
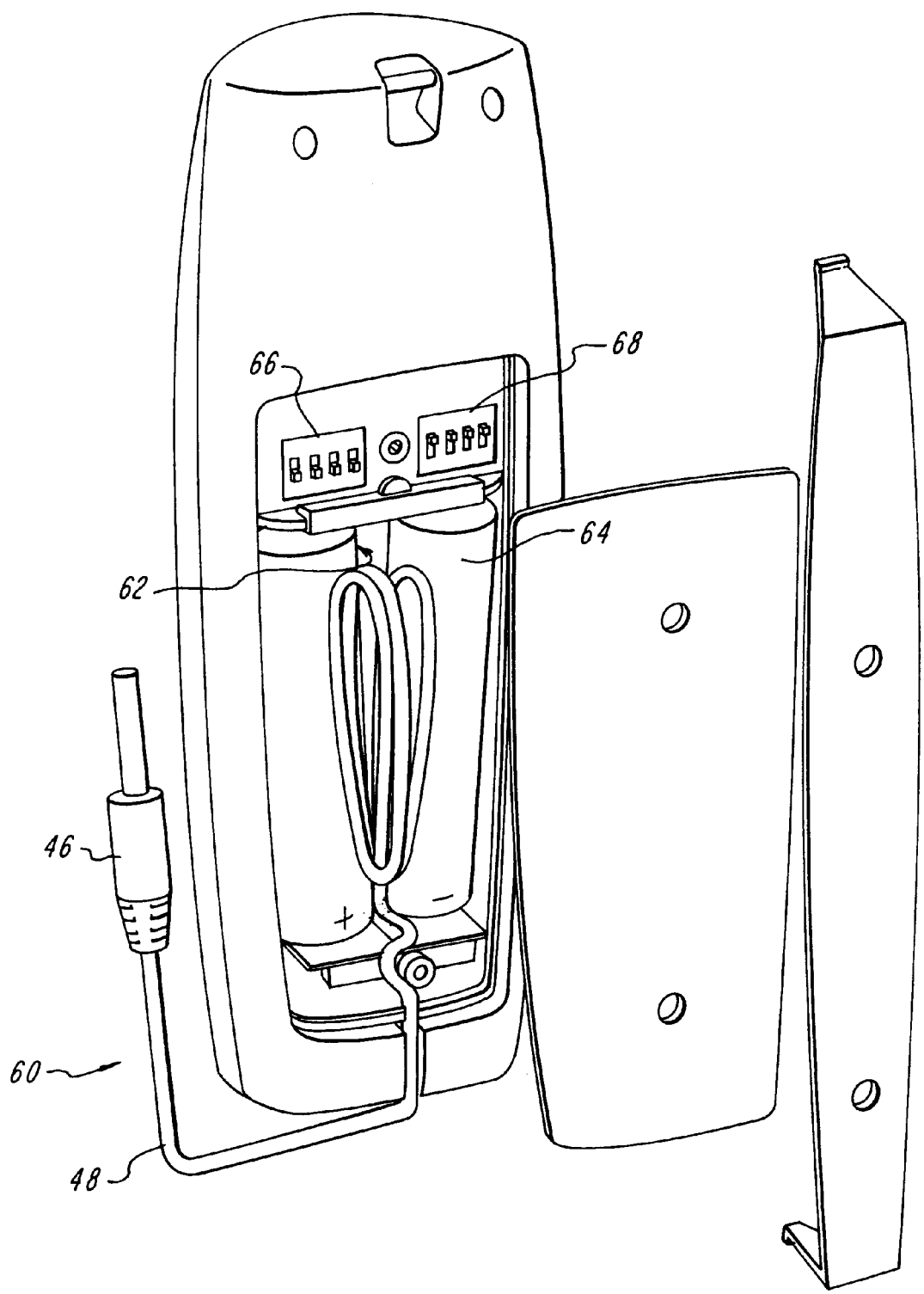
FIG. 3 is a perspective view of the back of the portable, battery-powered temperature station of the present invention with the battery door and wall mounting bracket removed.

Referring now to FIG. 3, generally designated at 60 is a perspective view of the back of the portable, battery-powered RF transmitter of the multi-station RF thermometer and alarm system of the present invention with its battery door and wall mounting bracket removed. Chamber generally designated 62 defined in the battery receiving compartment provides a space in which the cable 48 may be looped and stored between batteries 64. Any selected length of the cable 48 of predetermined length may be payed-out of the chamber 42 to allow the waterproof probe 46 to reach intended temperature measurement locations as determined by the needs of each particular applications environment.

As shown, channel "A" and "B" selector and station ID switches 66, 68 are preferably mounted in the battery compartment, although any other suitable location therefor could be employed.

Figure 4:
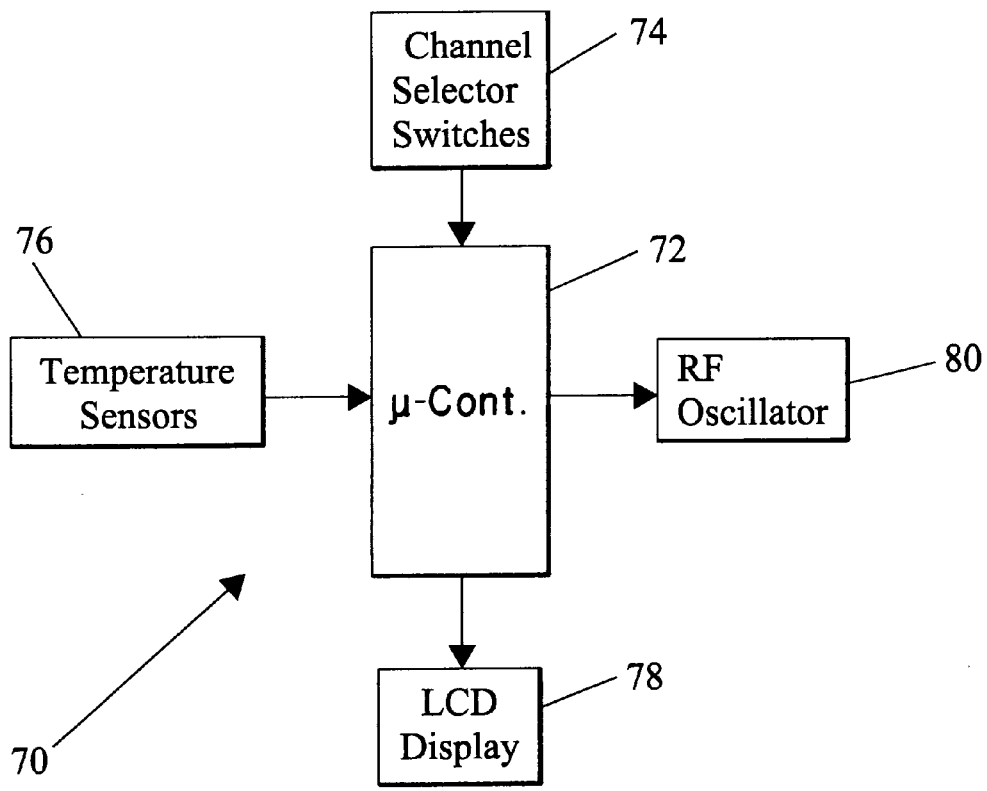
FIG. 4 is a functional block diagram of the portable, battery-powered temperature station of the multi-station RF thermometer and alarm system of the present invention.

Referring now to FIG. 4, generally designated at 70 is a functional block diagram of the portable, battery-powered RF thermometer of the multi-station RF thermometer and alarm system of the present invention. Digital controller 72, operatively connected to RAM memory and ROM memory, not shown, is connected to channel setting and station identifying DIP switches 74, temperature sensor 76, LCD display 78, and a three hundred and fifteen (315) megahertz RF oscillator 80. The channel set switches 74 preferably are two (2) DIP switches (containing four (4) SPST switches each), each for channel "A" and for channel "B". In use, each RF thermometer is set to a different four (4) bit ID code on either channel, and the receiver is set to either bank A or bank B. This minimizes the problem of interference from a neighboring multi-station RF thermometer and alarm system, and/or from environmental sources of interference. Although channel selecting and station identifying DIP switches are presently preferred, other channel setting and/or station identifying means in the transmitter could be employed.

The controller 72 preferably is an OKI Semiconductor MSM64162 microcontroller (with internal RAM and ROM). The temperature sensor 76 preferably is a Semitec 103AT-2B thermistor. The LCD display 78 preferably is a custom-manufactured display.

The controller 72 (1) measures the resistance of the thermistor of the temperature sensor 76 and numerically calculates the temperature corresponding thereto, (2) encodes a data packet having redundant first data representative of the sensed temperature and redundant second data representative of the transmitter ID and (3) controls the RF oscillator 80 to transmit a data frame having the encoded data packets at random time. In addition, the controller 72 performs the functions of displaying the temperature on the liquid crystal display 78 and checking the battery voltage.

Figure 5:
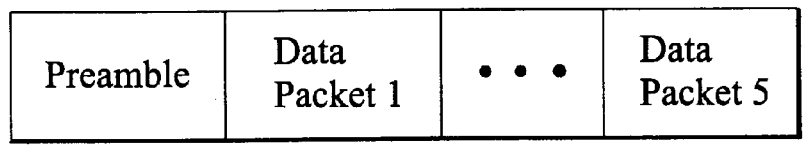
FIG. 5 is a diagram illustrating the data format of the portable, battery-powered temperature station of the present invention.

In one preferred embodiment, the controller 72 transmits eight hundred eighty five (885) millisecond data packets on a randomized schedule of approximately twice per minute, randomly selected every thirty (30) to sixty (60) seconds, with no less than thirty seconds between transmissions. The average duty cycle of any one hundred (100) millisecond portion of the transmission does not exceed fifty (50) percent, permitting a six (6) dB increase in the peak output power from the transmitter. The eight hundred and eighty five (885) millisecond transmission consists of a preamble followed by five (5) identical data frames as shown in FIG. 5. A Manchester-like encoding technique is preferably used for the data frames.

A preamble signals the start of transmission and allows the data slicer to be described time to stabilize before the data is sent. As appears more fully below, each data frame contains a wait (low) pulse, a sync (high) pulse, a start (low) pulse, a sixteen (16) bit channel ID word, a four (4) bit setup word and a sixteen (16) bit BCD temperature word.

The preamble is a square-wave train, consisting of twenty (20) high pulses and nineteen (19) low pulses. The wait pulse is low for two (2) bit periods. The sync pulse is high for four (4) bit periods. The start pulse is low for two (2) bit periods. The data is sent as (bit) followed by (complement of bit). Thus, the sixteen (16) bit ID word is represented by thirty two (32) bits, the four (4) bit setup word is represented by eight (8) bits, and the sixteen (16) bit temperature word is represented by thirty two (32) bits. The complete transmission is four hundred and thirty nine (439) bit periods in duration.

Example of Complete Transmission

Channel ID 1101 0011 0101 100=D358
Temperature=024.7
(preferably transmitted in ° F.)=000 0010 0100 0111=0247
Setup Word=(positive temperature, unused bit, unused bit, battery good)=1010

The bits are converted so 0's are represented by 01 and 1's are represented by 10. Using this, the data becomes:

Channel ID=1010 0110 0101 1010 0110 0110 1001 0101
Setup Word=1001 1001

Temperature=0101 0101 0101 1001 0110 0101 0110 1010
Actual Transmission:

```
1010 1010 1010 1010 1010 1010 1010 1010 1010 101 preamble
00 wait                                             FRAME 1
1111 sync
00 start
1010 0110 0101 1010 0110 0110 1001 0101 channel ID
1001 1001 setup data
0101 0101 0101 1001 0110 0101 0110 1010 temperature
00 wait                                             FRAME 2
1111 sync
00 start
1010 0110 0101 1010 0110 0110 1001 0101 channel ID
1001 1001 setup data
0101 0101 0101 1001 0110 0101 0110 1010 temperature
00 wait                                             FRAME 3
1111 sync
00 start
1010 0110 0101 1010 0110 0110 1001 0101 channel ID
1001 1001 setup data
0101 0101 0101 1001 0110 0101 0110 1010 temperature
00 wait                                             FRAME 4
1111 sync
00 start
1010 0110 0101 1010 0110 0110 1001 0101 channel ID
1001 1001 setup data
0101 0101 0101 1001 0110 0101 0110 1010 temperature
00 wait                                             FRAME 5
1111 sync
00 start
1010 0110 0101 1010 0110 0110 1001 0101 channel ID
1001 1001 setup data
0101 0101 0101 1001 0110 0101 0110 1010 temperature
```

The entire transmission consists of four hundred thirty nine (439) bits in eight hundred eighty five (885) milliseconds, with a bit duration of 2.016 milliseconds.

In another preferred embodiment, where time-of-next transmission scheduling is included in the data frames as a means of conserving power in the multi-station base station, the data frames, in addition to the preamble, channel ID, and temperature words, include time-to-next transmission information. If the "time to next transmission" is represented in seconds, six (6) bits will give zero (0) to sixty-three (63) seconds of wait time. Inclusion of these bits (and the complemented bits) adds an additional twelve (12) bits to each frame and sixty (60) bits to the complete packet, giving a four hundred ninety nine (499) bit transmission. An alternative means of specifying the "time to next transmission" is to send the number of seconds deviation from the average transmission interval. For instance, if the transmission randomly deviates by plus/minus ten (10) seconds from a nominal value of forty (40) seconds, a five (5) bit time code could be used (range 00–31 seconds or plus/minus 16 seconds). If it is desired to have a much longer interval between transmissions, the actual time and date of the next transmission(s) could be set. This could be represented in BCD digits in seconds/hr/days/month format, or by a count-down time expressed in seconds (or tens of seconds, or hundreds of seconds, and so on.) Other schemes may be employed as well without departing from the inventive concepts.

Figure 6:
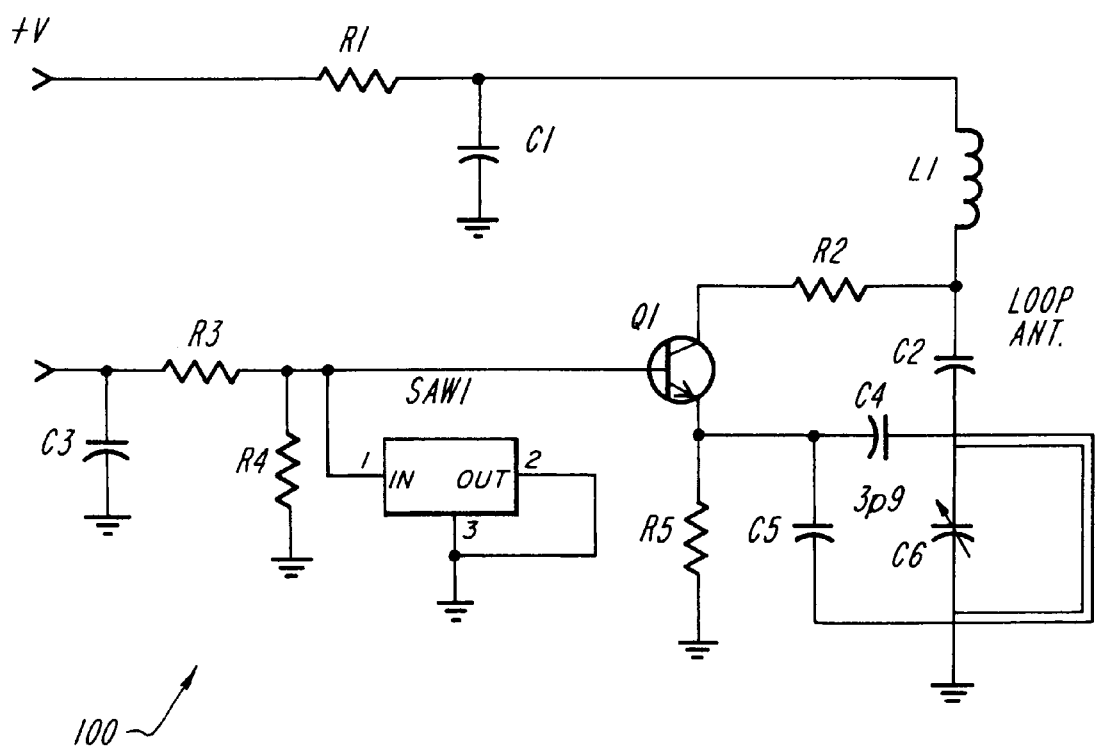
FIG. 6 is a schematic circuit diagram of the RF oscillator of the portable, battery-powered temperature station of FIG. 4.

Referring now to FIG. 6, generally designated at 100 is a schematic circuit diagram of the RF oscillator of the portable, battery-powered RF transmitter of FIG. 4. The RF oscillator includes transistor Q1 in a saturated Pierce-like oscillator configuration, preferably resonant at three hundred and fifteen (315) megahertz, with frequency stabilized by SAW resonator marked "SAW1" connected to the base of transistor Q1. A loop antenna marked "LOOP ANT" is preferably etched with the oscillator on a printed circuit board, not shown. ON/OFF keying ("OOK") modulation of the three hundred and fifteen (315) megahertz carrier is provided for by applying zero (0) and positive three (+3) volt logic levels to the data input (resistor R3) from the controller 72 (FIG. 4). Elements R1, R2, R3, R4 and R5 set the operating point of transistor Q1(R3 also serves as an input port for modulating the transmitter); elements C4, C5 and C6 in conjunction with the loop antenna provide a tuned output network that attenuates harmonics. C3 is a bypass capacitor to prevent RF energy being fed back to the controller through the data input. Element C1 is a bypass capacitor to provide a low impedance path for the circulation of RF current. C2 couples the output network to the collector of Q1. L1 is the collector inductor.

Figure 7:
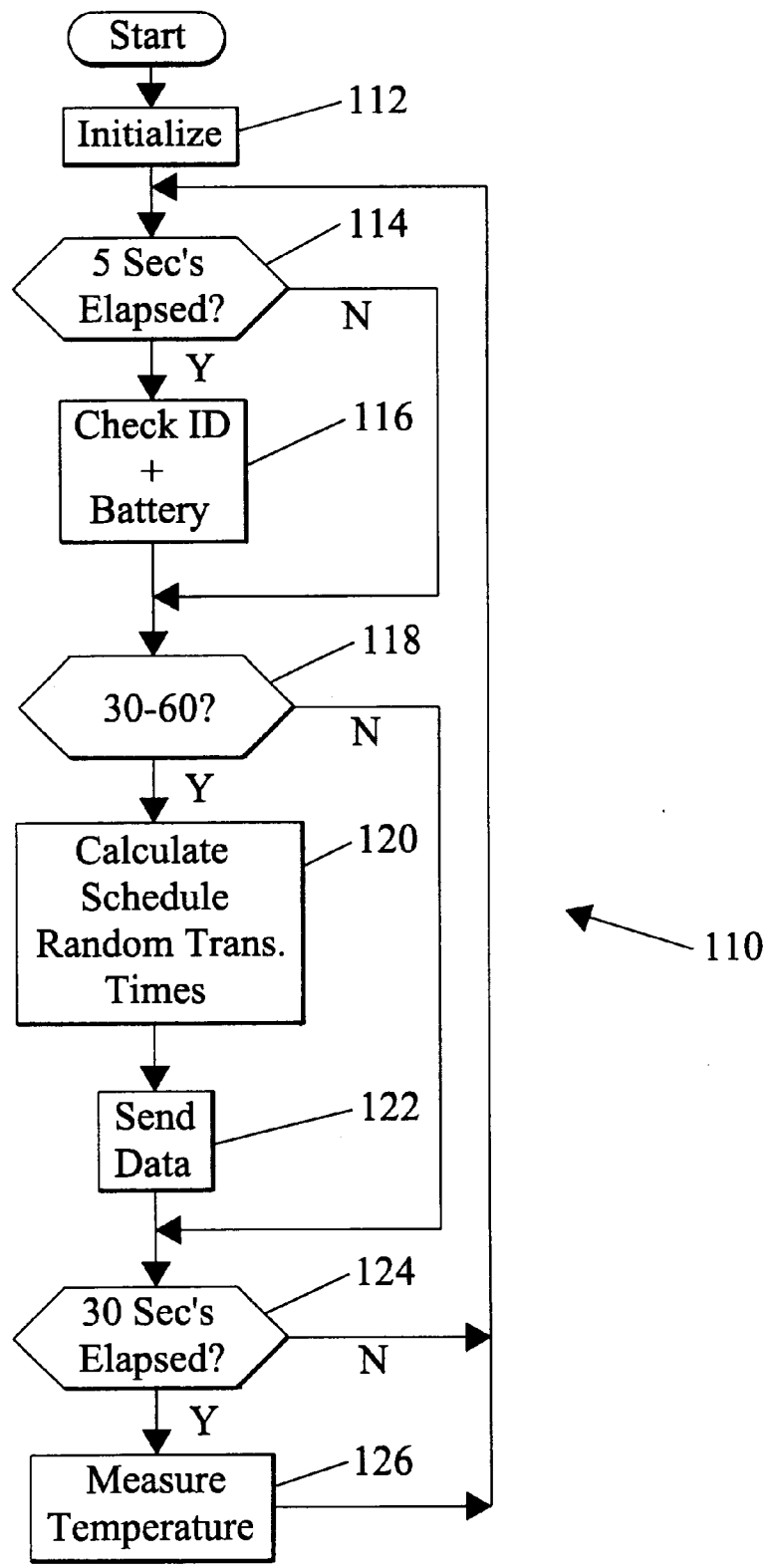
FIG. 7 is a flow chart of the processor of the portable, battery-powered temperature station of FIG. 4.

Referring now to FIG. 7, generally designated at 110 is a flow chart illustrating the operation of the controller of the portable, battery-powered RF thermometer of the multi-station RF thermometer and alarm system of the present invention.

As shown by a block 112, the processor is operative to initialize, and as shown by a block 114, is operative to determine whether five (5) seconds have elapsed.

If five (5) seconds have elapsed, the processor is operative to check channel identification and battery status as shown by a block 116. Although the processor preferably checks channel ID and battery status every five (5) seconds, other intervals could be employed.

As shown by a block 118, the processor is then operative to determine whether it is time to randomly transmit its data packet of redundant data frames. Any suitable technique, such as a random number generating algorithm, may be employed.

If it is, and time-of-next transmission scheduling is employed, the processor is operative to generate a schedule of random transmission times as shown by a block 120, and then is operative to transmit its data packets as shown by a block 122.

As shown by a block 124, the processor is then operative to determine if thirty (30) seconds have elapsed since the last temperature measurement. If thirty (30) seconds have not elapsed, processing returns to the block 114. Although thirty (30) second temperature measurement intervals are presently preferred, other temperature measurement intervals could be employed.

As shown by a block 126, if thirty (30) seconds have elapsed, the processor is operative to measure the temperature, and processing returns to the block 114.

Figure 8:
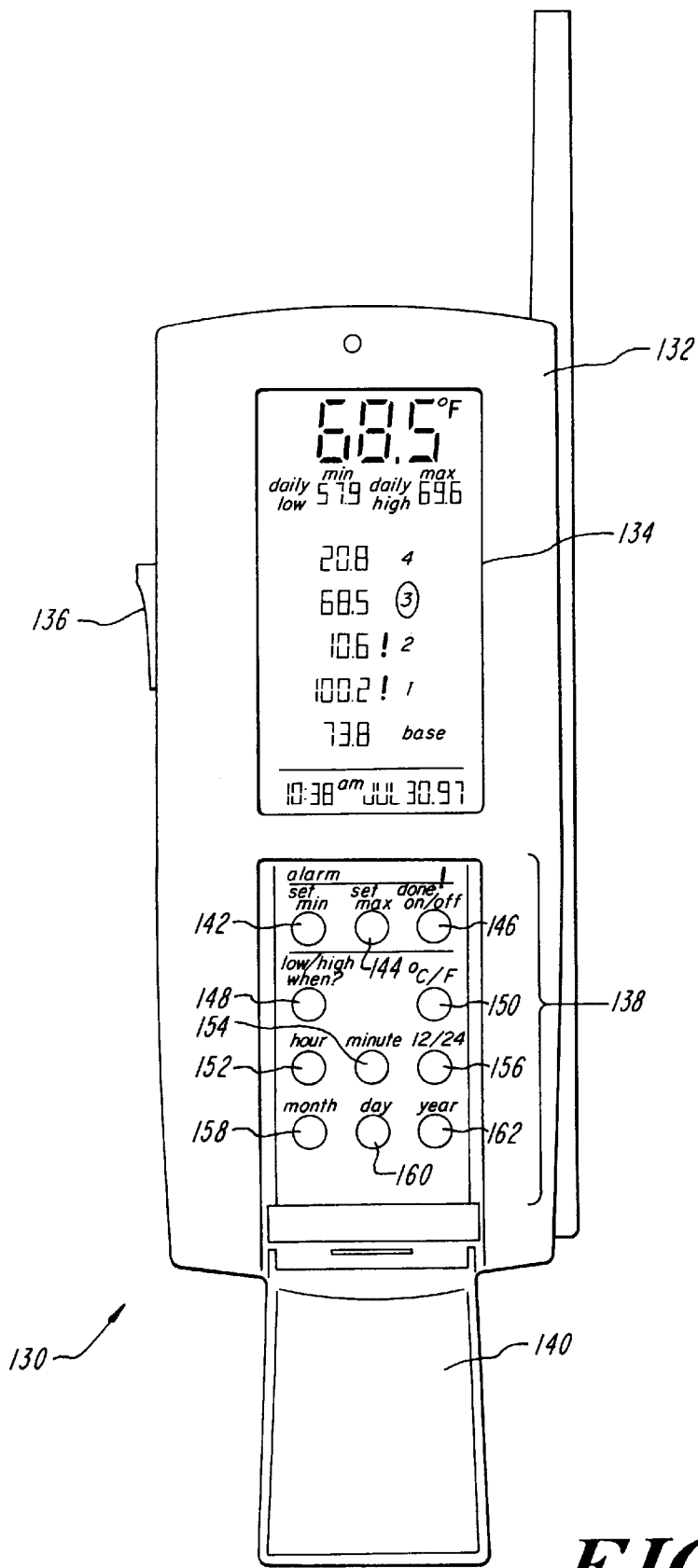
FIG. 8 is a front elevational view of the multi-station base station of the multi-station RF thermometer and alarm system of the present invention.

Referring now to FIG. 8, generally designated at 130 is a front elevational view of the multichannel base station of the multi-station RF thermometer and alarm system of the present invention. The multichannel base station 130 includes a housing 132, an easy-to-read multi-field reconfigurable display 134 mounted to the housing 132, a scroll key 136, a control panel schematically illustrated by bracket designated 138 and a control panel door 140 that protects the control panel 138 when it is not being used. The base station 130 includes one (1), two (2) position channel switch, a piezo audible alerter and an audible alerter disable switch, not shown. Although a channel setting DIP switch is presently preferred, other channel setting means in the receiver could be employed.

The control panel 138 includes three (3) alarm keys 142, 144, and 146 respectively marked "set min", "set max", and "done on/off"; a "low/high" "when?" key 148; a "° C./F." key 150; an hour set key 152 marked "hour"; a minute set key 154 marked "minute"; a "12/24" key 156; a month key 158 marked "month"; a day key 160 marked "day" and a year key 162 marked "year".

The multichannel base station 130 is operable in three (3) basic modes. In a decode/display mode described more fully hereinbelow, the multichannel base station 130 concurrently displays temperature information for each active location (remote and base), as well as displays temperature high and low information for any location selected by depressing the scroll key 136.

In alarm set mode described more fully hereinbelow, the multichannel base station 130 allows the user to independently set alarm minimum and maximum temperature limits for each temperature location by use of the scroll key 136 and the set min, set max, and on/off keys 142, 144, 146.

In alarm announce mode described more fully hereinbelow, the multichannel base station 130 provides audible, visible and/or remote signal indications whenever one or more monitored locations have temperature values that are out-of-bounds.

The ° C./F. key 150 changes the display from centigrade to Fahrenheit in any mode.

The low/high when? key 148, when depressed, displays the high and low temperatures for locations selected by the scroll key 136, as well as the time when those highs and lows were registered.

The hour, minute and 12/24 keys 152, 154, and 156 set the time; and the month, day, and year keys 158, 160, and 162 set the date.

Description labels, not shown, may be provided on the inside of the door 140 to identify the locations of each of the one or more remote RF thermometers.

Figure 9:
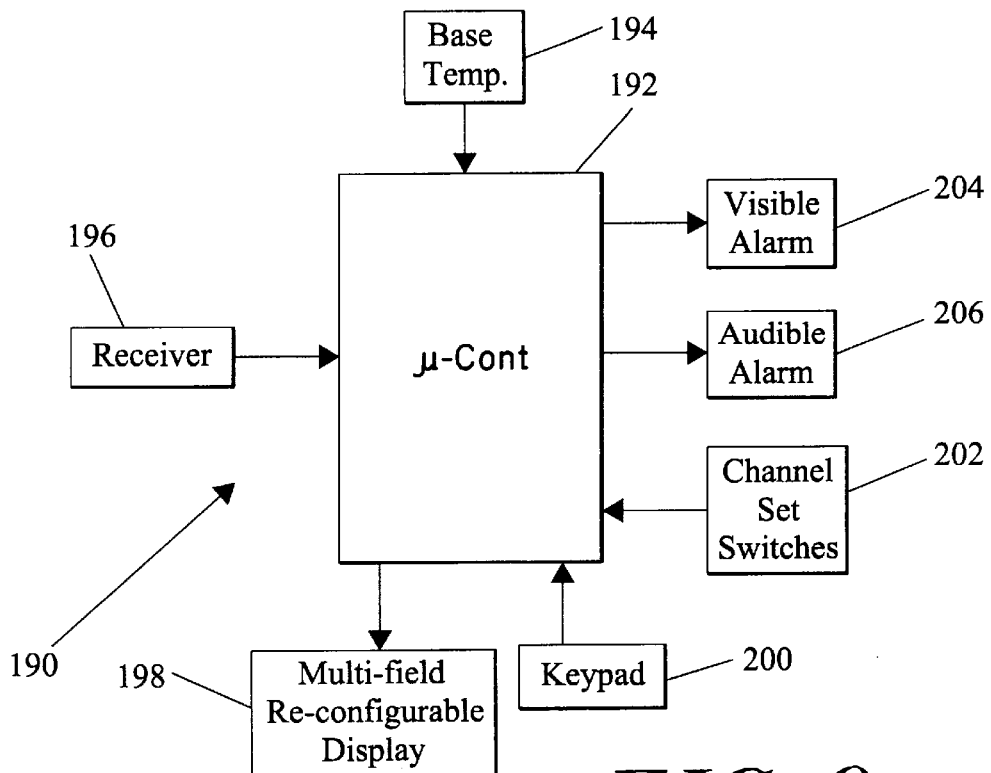
FIG. 9 is a functional block diagram of the multi-station base station of the present invention.

Referring now to FIG. 9, generally designated at 190 is a functional block diagram of the multichannel base station of the multi-station RF thermometer and alarm system of the present invention.

A digital controller 192, preferably a Samsung KS57C2616 microcontroller with internal ROM and RAM, is connected to a local temperature sensor 194 (preferably consisting of an OKI Semiconductor MSM64162 microcontroller and Semitec 103AT-2B thermistor), a receiver 196, a multi-field re-configurable display 198, control panel 200, channel set switches 202 and to visible and audible alarms respectively designated 204, 206.

The local temperature sensor 194 preferably includes a thermistor located in the base station operative to sense the temperature in the environ thereof. Preferably, the local temperature sensor 194 includes a microcontroller, not shown, which measures the local temperature and sends this to the digital controller 192 which processes and displays the data on the display 198 in a manner to be described.

In the preferred embodiment, the digital controller 192 processes data received by the receiver 196 and displays data on the display 198 for up to four (4) remote temperature sensors, although a different number of remote temperature sensors could be employed. The controller 192 also monitors the keypad 200, keeps track of the time and date, and checks for alarm conditions (temperature exceeding user-specified limits at any location). In one embodiment, power is supplied by an external voltage adapter, and the multi-station base station is always "on." In another embodiment, where time-to-next-transmission data is provided, the multi-station base station is battery powered, waking-up to receive transmissions at scheduled times out of "sleep" mode. A battery backup circuit maintains the clock and user settings in event of power failure or power down. The visible alarm 204, preferably an LED, and the audible alarm 206, preferably a piezoelectric beeper, indicate the presence of an alarm condition.

Figure 10:
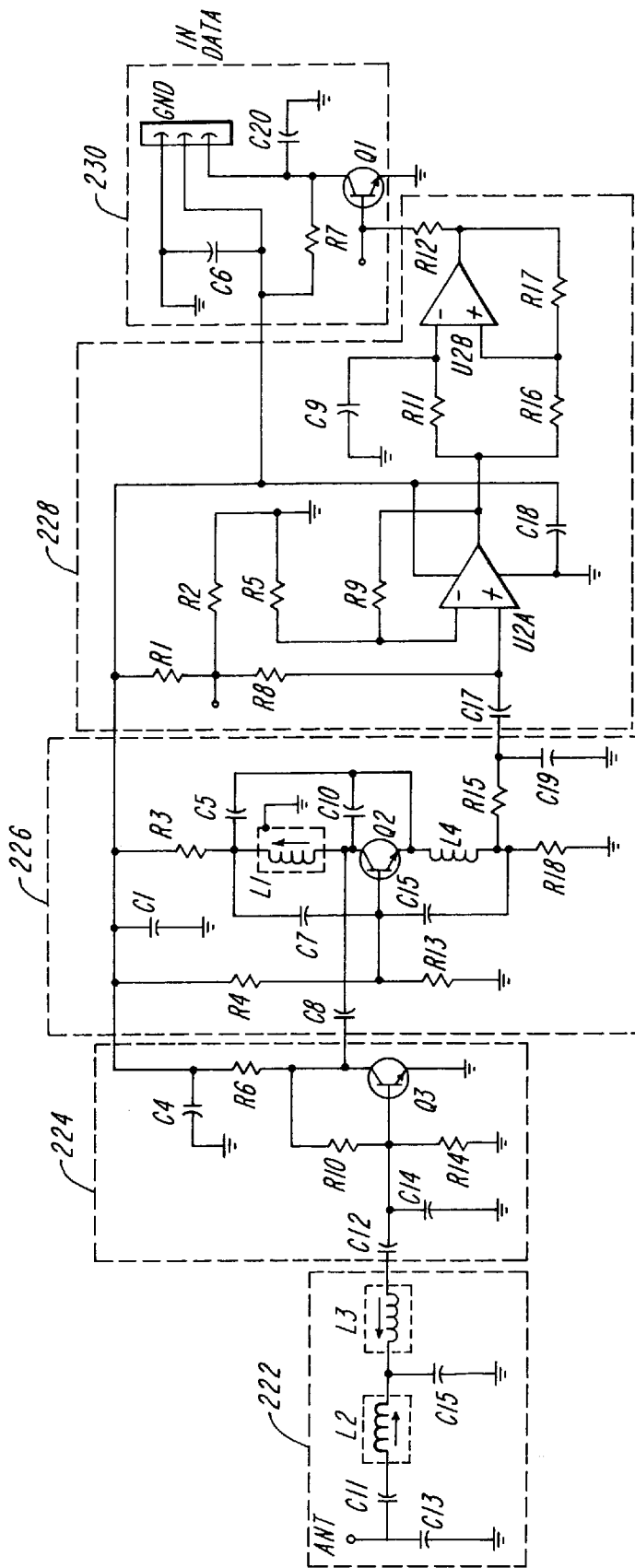
FIG. 10 is a schematic circuit diagram of the receiver of the multi-station base station of FIG. 9.

Referring now to FIG. 10, generally designated at 220 is a schematic circuit diagram of the receiver 196 (FIG. 9) of the multichannel base station of the multi-station RF thermometer and alarm system of the present invention. The receiver 220 includes a tuned circuit illustrated by dashed box 222 that improves selectivity. Capacitors C11, C13, C15 and inductors L2, L3 preferably are tuned to three hundred and fifteen (315) megahertz.

An input buffer schematically illustrated by dashed box 224 that minimizes radiation from the antenna is connected to tuned circuit 222. Buffer 224 includes transistor amplifier Q3. Capacitors C12, C14 couple the input signal to the base of transistor Q3, while resistors R6, R10 and R14 bias transistor Q3 to operate in a linear manner. R6 also serves as a collector load resistance. Capacitor C4 is a power supply decoupling capacitor.

A demodulator schematically illustrated by dashed box 226 for detecting the received signal is connected to transistor Q3 of the input buffer 222 via coupling capacitor C8. The demodulator includes transistor Q2 operated as a super-regenerative detector. Resistors R3, R4, R13 and R18 define the operating point of transistors Q2. Capacitor C7, C15 and resistors R4, R18 form the quench network for the super-regenerative detector. Inductor L4 serves to isolate the signal voltage from the biasing network. Resistor R15 and capacitor C19 provide a low-pass filter to remove quench-frequency components from the detector output, while the filtered output is coupled to the data slicer input via capacitor C17. Capacitor C1 provides power supply decoupling. Inductor L1 in conjunction with capacitors C5 and C10 form a tank circuit tuned to resonate at three hundred and fifteen (315) megahertz.

Data slicer schematically illustrated by dashed box 228 for extracting digital data from the detected signal is connected to the detector 226. The data slicer looks at the detector output, and responds to variations about the average signal level, corresponding to the digital data stream. Operational amplifier marked "U2A" is configured as a non-inverting amplifier to boost the detected signal. Operational amplifier marked "U2B" is configured as a comparator with hysteresis (Schmitt trigger circuit). Resistors R1 and R8 and capacitor C17 couple the demodulated signal to U2A while providing a high-pass filter to remove DC and slowly varying AC components. Resistors R5 and R9 set the gain of U2A. Resistors R1 and R2 provide a reference voltage to the non-inverting input of U2A. Capacitor C18 provides power supply decoupling. Capacitor C9 and resistor R11 low-pass filter the signal going to the inverting input of U2B. Resistors R16 and R17 set the amount of hysteresis. Resistor R16 also couples the U2A output to the U2B non-inverting input.

A level translator schematically illustrated by dashed box 230 is connected to the data slicer 228. With the RF carrier ON, the data output is approximately 0.2 volts; with the RF carrier OFF, the data output is positive five (+5) volts. Transistor Q1 is a clipping amplifier. Resistor R12 couples the data slicer output to the base of Q1. Resistor R7 is the collector resistor. Capacitor C20 prevents RF energy from the digital board from being fed back to the receiver through the data output. Capacitor C6 is a power supply bypass capacitor.

Figure 11:
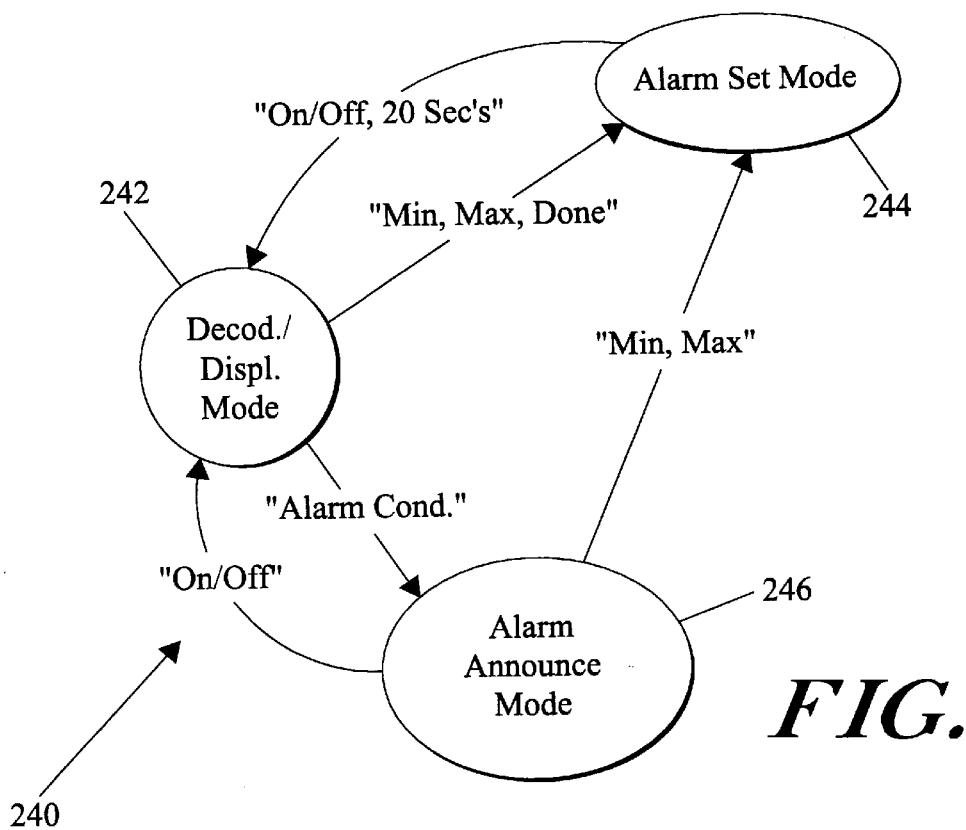
FIG. 11 is a state diagram of the processor of the multi-station base station of FIG. 9.

Referring now to FIG. 11, generally designated at 240 is a state diagram of the controller 192 (FIG. 9) of the multichannel base station of the multi-station RF thermometer and alarm system of the present invention. As shown by a block 242, the processor is operative in a decode/temperature display mode; as shown by a block 244, is operative in an alarm set mode; and as shown by a block 246 is operative in an alarm announce mode. As shown by an arrow marked "min, max, done" extending between the decode/temperature display mode 242 and the alarm set mode 244, the processor transitions from mode 242 to mode 244 whenever the user presses the min, the max, or the done key 142, 144, or 146 (FIG. 8).

As shown by an arrow marked "on/off, 20 sec's" extending between alarm set mode 244 and decode/temperature display mode 242, the processor is operative to transition from the alarm set mode back to the decode/temperature display mode whenever the operator depresses the done on/off key 146 (FIG. 8), or when twenty (20) seconds of inactivity have elapsed.

Whenever an out-of-bounds alarm condition exists at any of the remote and/or base locations, the processor is operative to transition from the temperature display mode 242 to the alarm announce mode 246 as illustrated by an arrow 252 marked "alarm condition."

As illustrated by an arrow marked "on/off" extending from the alarm announce mode 246 to the decode/temperature display mode 242, the processor is operative to transition from the alarm display mode to the decode/temperature display mode whenever the operator pushes the done, on/off key 146 (FIG. 8).

As illustrated by an arrow marked "min, max" extending between the alarm announce mode 246 and the alarm set mode 244, the processor is operative to transition from the alarm announce mode to the alarm set mode whenever the operator depresses the min key 142, or the max key 144 (FIG. 8).

Figure 12:
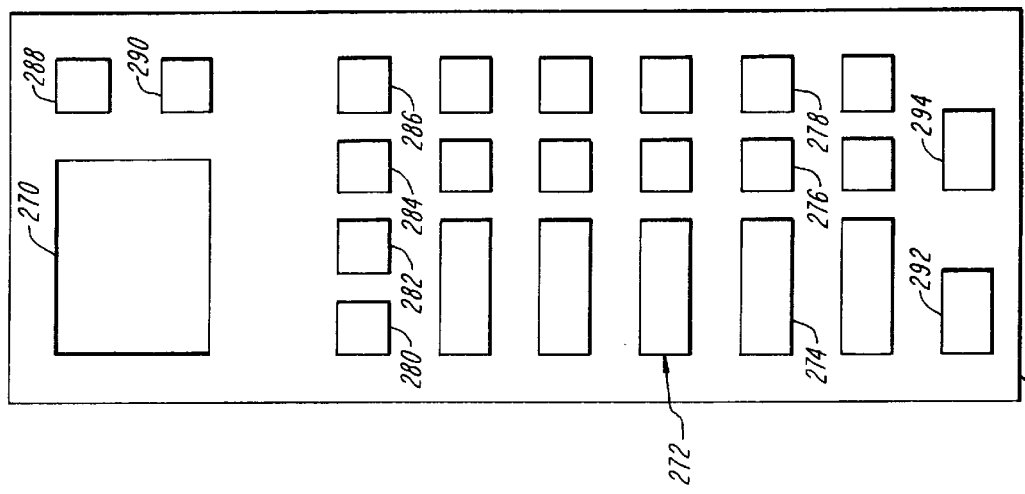

With reference now to FIG. 12, which shows a pictorial diagram generally designated 270 that illustrates the display of the multi-field re-configurable display configured in decode/display mode, the operation of the multi-channel base station in decode/display mode will now be described. In decode/display mode, the display includes a comparatively-large active location field 270 and five (5) comparatively-smaller temperature station (remote and base) fields generally designated 272. Each of the five (5) temperature station fields 272 includes a temperature field 274, an alarm set field 276, and a station ID field 278.

A daily low icon field 280, a daily low temperature field 282, a daily high icon field 284, and a daily high temperature field 286 are provided below the active location field 270. Degree centigrade and degree Fahrenheit fields 288, 290 are provided immediately to the right of the active location field 270.

Time field 292, and a date field 294, are provided adjacent the bottom of the display.

Upon startup, the initial display is called the "idle" display which shows all temperatures for all active locations (base and remote) in the five (5) temperature station fields 272, and displays the base station temperature in the active location field 270. Each location is numbered "1", "2", "3", "4", and "base" in the station identification fields 278. Only locations that have active data are displayed. All other locations remain blank, including their location number. All alarms are initially off. Default is degrees Fahrenheit.

A circle, not shown, around the location number is displayed in the station identification field 276 to indicate the active location.

The lowest and highest registered temperature in the past twenty four (24) hours (preferably reset at midnight each day) is displayed in the low and high temperature fields 282, 286 below the active large readout temperature field 270, and high and low icons are displayed in the low and high icon fields 280, 284. The temperature display for all locations is ° F./° C. switchable by depressing the ° C./F. key 150 (FIG. 8), and the corresponding icon is displayed in the centigrade and Fahrenheit icon fields 288, 290.

If a good signal has not been received from a remote transmitter in a fifteen (15) minute period, a bad signal screen indicator (preferably, "Blank") is displayed in that temperature location field 274. If the faulty location is the active location, then both the large display readout 270 and the smaller temperature display 272 are blanked.

For the eleven (11) keys of the control panel 138 (FIG. 8) accessed by opening the door 140 (FIG. 8) on the front of the unit, pressing a key once gets you into its function and pressing it again takes you back out of the function to idle screen. The exception is for "set min" and "set max" keys 142, 144 (FIG. 8); the "alarm on/off/done" key 146 (FIG. 8) needs pressed to exit.

When in a set up mode (time, date, alarm), if no keys are pressed for twenty (20) seconds, then the display returns to the idle display and any changes made by the operator inside any function are saved. The exception is exiting in "alarm announce" mode, either by pressing the done/on/off key 146 (FIG. 8) or by pressing the min or max keys 142, 144 (FIG. 8).

The "° C./F." key 150 and the "12/24" key 156 (FIG. 8) alternate between their two modes each time the key is pressed.

From idle display, the "low/high/when?" button 148 (FIG. 8) when pressed flashes the daily low icon in the daily low icon field 280 while it shows the active location temperature and the hours/minutes when this daily low temperature was recorded. After five (5) seconds, the display flashes "daily high" for five (5) seconds in the daily high icon field 284 and shows temperature and time of day when the daily high was reached, then returns to idle display.

The sound on/off slide switch, on the side of the unit, not shown, controls the piezoalerter 206 (FIG. 9). In the "off" state all sounds including the key click sound is turned off.

Whenever a user presses an incorrect key a negative five (5) quick beeps sound is heard and no changes are made.

When in time change mode, if the "12/24" key 156 (FIG. 8) is pressed, then it toggles and leaves time change mode, saves any changes made, and returns to the idle screen.

When in any set mode, if the receiver receives data from a transmitter it saves it and updates the display only after the operator exits from the set mode.

Figure 13:
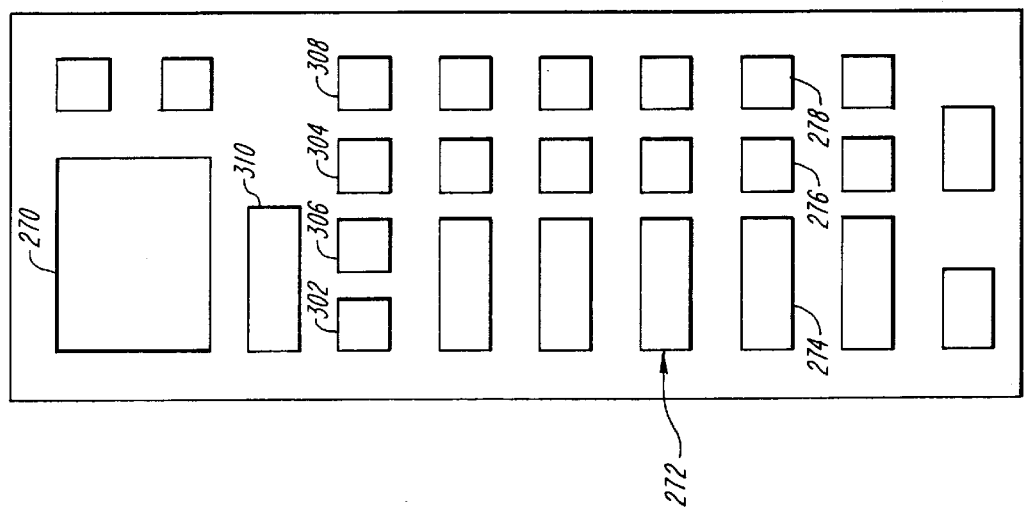

With reference now to FIG. 13, which shows a pictorial diagram generally designated 300 of the multi-field re-configurable display configured in "alarm set" mode, the operation of the processor in alarm set mode will now be described. The set alarms display 300 is generally the same as the idle display of FIG. 12, except that the daily high and low icon and temperature fields are reconfigured to display minimum and maximum icons 302, 304 and minimum and maximum value fields 306, 308; and except that a "set temperature" icon field 310 is provided.

When a user presses the "set min" or "set max" buttons 142, 144 (FIG. 8), the display changes from the idle display to the "set alarms" display. In the set alarms display, the active location is the only temperature shown (in the lower temperature area 272 and in the larger upper display area 270). The daily high/low values disappear, and are replaced by the min and max alarm range temperature values in the min and max value fields 306, 308. When the current temperature location goes outside these values, then the alarm mode to be described for this location becomes active.

Alarm min/max values are set one location at a time. The first time the "set min" or "set max" buttons 142, 144 (FIG. 8) are pressed, the "min" number shows five (5) degrees below the current temperature of that location and the "max" value starts at five (5) degrees above the current temperature in the min and max value fields 306, 308. After this, when entering new set min and set max values, the values will be the previously set values.

To set the minimum and maximum temperature targets for a location, the scroll bar 136 (FIG. 8) is depressed to select the location to set. In the set alarms display mode, the active location is the only temperature shown in the temperature station fields 272 and in the active location field 270.

The set min key 142 (FIG. 8) is depressed once. The words "set min" start flashing in the minimum field 302 and "set temperature alarm" is displayed in the set temperature icon field 310.

The scroll bar 136 (FIG. 8) is then depressed to adjust the temperature limit up or down until the desired number is reached. Adjustment occurs one-tenth (0.1) degrees at a time at a rate of two (2.0) degrees per second. When in alarm min/max set mode, the scroll rate goes to five (5) degrees/second if the scroll key 136 (FIG. 8) is held for more than three (3) seconds.

In a similar manner, the set max key 144 is depressed and the scroll bar 136 (FIG. 8) is then depressed to adjust the maximum temperature as well, whereupon the set max words start flashing in the max icon field 304.

To exit alarm set mode, the done key 146 (FIG. 8) is depressed. The alarm mode is automatically switched to "on" upon exit. An icon appears in the alarm set field 276 beside the location number in the station identification field 278 to indicate that this location is now in the "on" state. At the top the display, the daily low and high temperatures being displayed for that location are replaced with the min and max set temperatures for that location while the alarm is in the "on" condition.

When in the alarm set mode the minimum temperature cannot go above the maximum temperature and the maximum temperature cannot go below the minimum. A beep is heard if min and max become equal.

Figure 14:
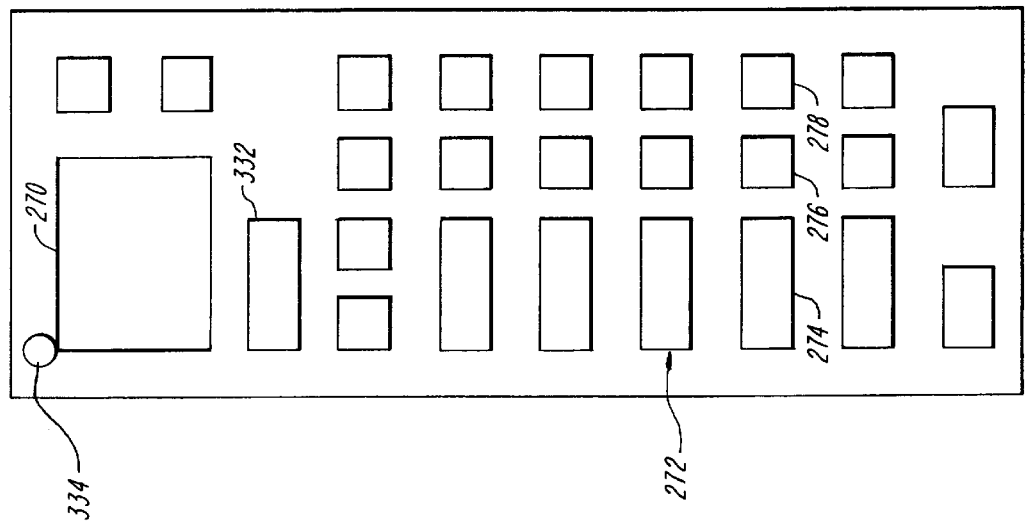
FIGS. 12–14 are pictorial diagrams illustrating the multi-field reconfigurable display of the multi-station base station of FIG. 9 respectively configured in decode/display mode, alarm set mode and alarm announce mode.

With reference now to FIG. 14, which shows a pictorial diagram generally designated 330 of the multi-field re-configurable display configured in alarm announce mode, the operation of the processor in alarm announce mode will now be described. The alarm announce mode display 330 is generally the same as the alarm set display 300 (FIG. 13), except that the set temperature icon field is reconfigured as a temperature alarm icon field 332, and an LED alarm 334 and an audible alarm, not shown, are enabled.

If the temperature of any location goes outside the min-max alarm range and the alarm for that location has been turned on (icon displayed in the alarm set field 276 beside the location identifier in the station identification field 278), then an alarm announce state exists and the display goes into the "alarm announce" display mode. The location with the alarm becomes the active location and is the only location that shows on the display (in the lower 272 and upper 270 display areas). The "temperature alarm" icon is displayed in the temperature alarm icon field 332, and it flashes. The LED 334 flashes, the "alarm on" icon in the temperature alarm icon field 332 flashes, and if sound is "on", the sound beeps.

To exit the alarm announce state, the operator can do several things. (All keys except min, max, and done are locked out and cannot be used). The operator can press the alarm on/off button 146 (FIG. 8) which turns the alarm on/off icon off and, after one (1) second, the display returns to idle mode display. The operator could also press either the "set min" or "set max" buttons 142, 144 (FIG. 8) and the display immediately goes to the "set alarms" display mode and the operator may adjust the min–max range to turn off the alarm in the manner described above. If the operator leaves the "set alarm" mode and an alarm condition still exists, then the display returns to the idle display for one (1) second, then returns to the "alarm announce" display.

When a multiple alarm condition exists, then the "alarm announce" display shows all locations in the temperature station fields 272 that have an alarm condition. The "active" location is the location with the lowest number (e.g., "1" instead of "3", or "2" instead of "3", etc.; "base" location is location "0"). The operator depresses the scroll key 136 (FIG. 8) to handle each alarm state, one location at a time, in the manner described above. When an alarm is cleared, then after one (1) second, that location disappears from the display and the next lowest number location become the "active" location. When the last location is cleared, then the display waits two (2) seconds and returns to idle display.

If a good signal has not been received from a remote transmitter in a fifteen (15) minute period, that temperature location goes blank, indicating a bad transmission. If the faulty location is the active location, then both the large display read out and the smaller temperature display with the location number defaults to the base as the active location.

Figure 15:
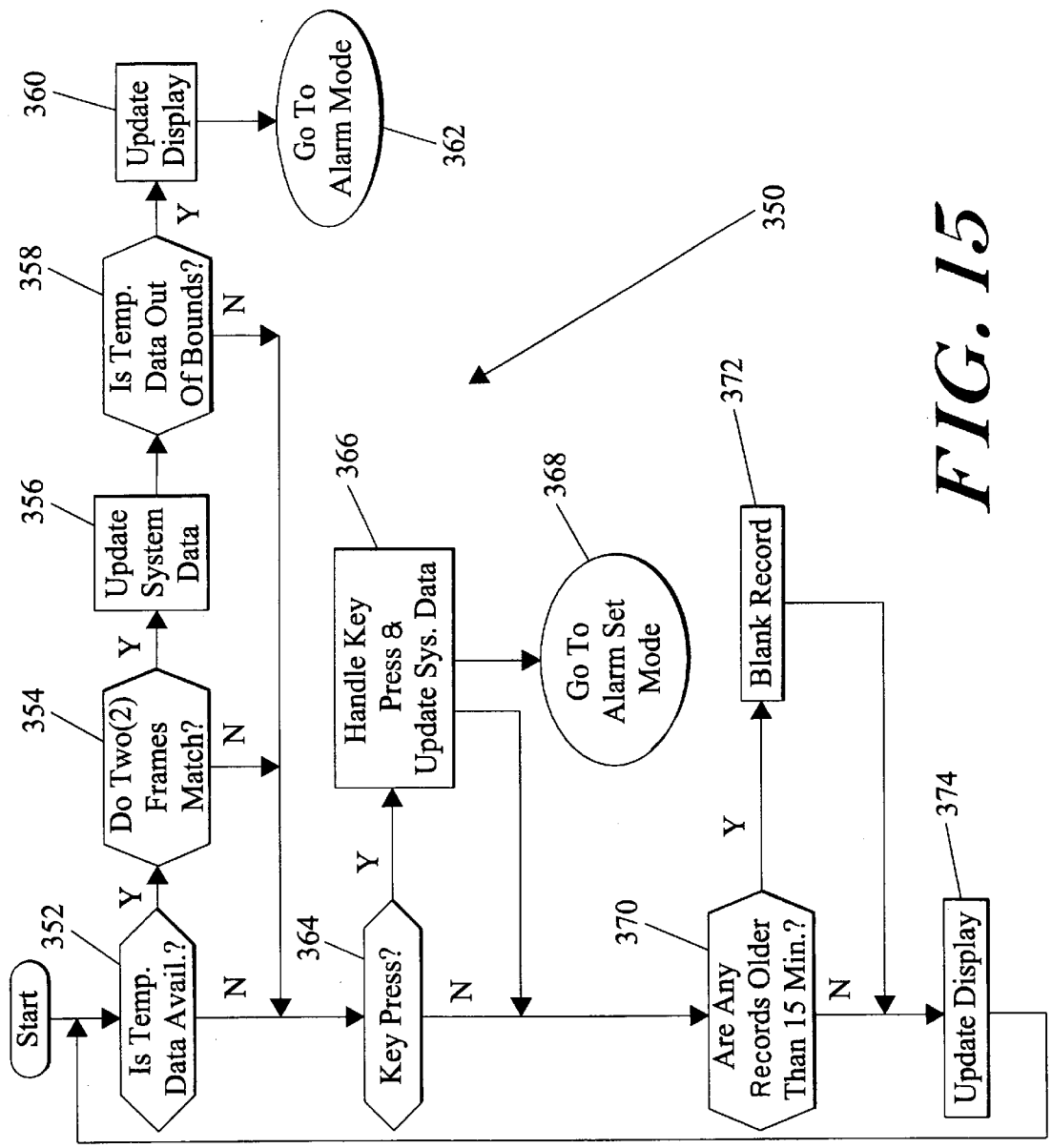
FIG. 15 is a flow chart of the processor of the multi-station base station of FIG. 9.

Referring now to FIG. 15, generally designated at 350 is a flow chart of the processor of the multi-channel base station of the multi-station RF thermometer and alarm system of the present invention. As shown by a block 352, the processor is operative to determine if any temperature data is available. In one embodiment, the processor is always on, monitoring for temperature data. In another, it is "asleep," waking up at scheduled times to monitor for temperature data. Any suitable data monitoring technique, such as an interrupt, may be employed.

If data is available, the processor is operative to determine whether two (2) frames of the redundantly transmitted data match as shown by a block 354.

As shown by a block 356, if two (2) frames match, the processor is operative to update the system data. System data includes the time of last receipt and the minimum and maximum received temperature values received in a twenty four hour period.

As shown by a block 358, the processor is then operative to determine whether the received temperature data is out of bounds.

If it is, as shown by a block 360, the processor is operative to update the display, and to transition to alarm mode as shown by a block 362.

If no temperature data is available, or if two (2) frames of the redundantly transmitted data do not match for a given channel, or if there is no out of bounds conditions, the processor is operative to determine whether there has been a key press as shown by a block 364.

If there was a key press on the control panel, the processor is operative to handle the key press as shown by a block 366 and to update system data as appropriate.

As shown by a block 368, if the keypress input changed operating mode, the processor is operative to transition to alarm set mode as shown by a block 368.

As shown by a block 370, the processor is then operative to determine whether any data is older than fifteen (15) minutes since the last temperature data was received.

If it is, the processor is operative to blank the record as shown by a block 372.

As shown by a block 374, the processor is then operative to update the display, and processing returns to the block 352.

Many modifications of the presently disclosed invention will become apparent to those of skill in the art without departing from the inventive concepts. For example, other modulation methods such as frequency-shift keying or phase-shift keying could be employed. Different data encoding schemes, weather information other than temperature such as humidity and/or pressure and/or sun shine, and different duty cycles could also be employed.

What is claimed is:

1. A single-frequency multi-station RF telemetry and alarm system providing monitoring of weather data at different locations of a region to be monitored that is suitable for home, office and light industrial use, comprising:

a plurality of portable, battery-powered and hand-holdable RF weather stations each providing measurement of weather data in any desired location where the same may be placed and telemetry of said measured weather data over a single predetermined frequency RF communication channel at times, determined in a preselected manner by each said portable, battery-powered and hand-holdable RF weather station, selected to allow joint transmission and substantially contention-free receipt at a multi-station base station of weather data telemetry from all of said plurality of portable, battery-powered and hand-holdable RF weather stations via said communication channel; and a hand-holdable multi-station base station that receives and displays the measured and transmitted weather data received from each of said portable, battery-powered and hand-holdable weather stations over said RF communication channel allowing a user at the multi-station base station to learn the weather conditions prevailing at each of said different locations of said region to be monitored where respective ones of said portable, battery-powered and hand-holdable RF weather stations may be placed.

2. The multi-station RF telemetry and alarm system of claim 1, wherein said RF weather station is a RF temperature station.

3. The multi-station RF telemetry and alarm system of claim 2, wherein each at least one portable, battery-powered temperature station includes an analog temperature sensor providing a temperature signal representative of sensed temperature; an antenna; and a processor-controlled transmitter coupled to the antenna and to the temperature signal operative (1) to periodically convert the temperature signal to a digital representation of the sensed temperature, (2) to digitally encode a data frame having first information representative of the sensed temperature and second information representative of station ID, and (3) to transmit a predetermined integral number of data frames each having said first and said second information at a random time.

4. The multi-station RF telemetry and alarm system of claim 3, wherein said predetermined integral number is greater than one (1).

5. The multi-station RF telemetry and alarm system of claim 4, wherein said processor-controlled transmitter coupled to the antenna and to the temperature signal operative to transmit a predetermined integral number greater than one (1) of data frames each having said first and said second information at a random time uses an OOK (on/off keying) transmission protocol.

6. The multi-station RF telemetry and alarm system of claim 3, further including operator setable switches coupled to said processor to specify station ID.

7. The multi-station RF telemetry and alarm system of claim 1, wherein each at least one portable, battery-powered station includes a housing; a waterproof probe electrically connected to the housing via an elongated flexible cable of predetermined length; an attachment member for stowing the probe to the housing when not in use; and means for paying out any selected length of the elongated flexible cable of predetermined length selected to accommodate the needs of each particular application.

8. The multi-station RF telemetry and alarm system of claim 7, wherein the housing includes a front wall and a battery receiving compartment, and the attachment member includes a well formed in the front wall of the housing dimensioned to frictionally receive the probe, and the pay-out means includes a wire-receiving chamber provided in the battery compartment of the housing.

9. The multi-station RF telemetry and alarm system of claim 2, wherein each at least one portable, battery-powered temperature station includes an analog temperature sensor providing a temperature signal representative of sensed temperature; an antenna; and a processor-controlled transmitter coupled to the antenna and to the temperature signal operative (1) to periodically convert the temperature signal to a digital representation of the sensed temperature, (2) to generate a time to next transmission schedule, (3) to digitally encode a data frame having first information representative of the sensed temperature, second information representative of station ID, and third information representative of said schedule, and (4) to transmit a predetermined integral number of data frames each having said first, said second and said third information at a select time.

10. The multi-station RF telemetry and alarm system of claim 9, wherein said predetermined integral number of data frames is greater than one (1).

11. The multi-station RF telemetry and alarm system of claim 1, wherein said multi-station base station includes a multi-field reconfigurable display; operator input means; a receiver for providing an output signal in response to received transmissions; and a processor coupled to the display, to the input means and to the receiver, that is operative in a decode/display mode to decode transmitted weather data and display it on said display for each station; an alarm set mode to allow operator at least one of alarm min and max value input and to display at least one of alarm min and max values on said display for each station; and an alarm announce mode to provide an alarm signal for each station out-of-bound's condition.

12. The multi-station RF telemetry and alarm system of claim 11, wherein said weather data is temperature data.

13. The multi-station RF telemetry and alarm system of claim 12, wherein in said decode/display mode said processor is operative to simultaneously display all stations having temperature data on said display.

14. The multi-station RF telemetry and alarm system of claim 12, wherein each at least one portable, battery-powered weather station is a temperature station that randomly transmits data packets having redundant first information representative of sensed temperature and second information representative of transmitting station ID, and wherein in said decode/display mode, the processor is operative (1) to configure the display with a temperature station zone for a given station, (2) to recover from the signal output of the receiver said first information representative of sensed temperature and said second information representative of transmitting station ID for each data frame of the redundantly transmitted data packet, and (3) to display the recovered temperature data in a zone corresponding to the identified stations if the first information representative of the sensed temperature of two (2) of the redundantly transmitted data frames conform to each other for a given station.

15. The multi-station RF telemetry and alarm system of claim 14, wherein the display is configured with a comparatively-large "active" location field, with a plurality of comparatively-smaller temperature station fields, and with temperature high and low fields, and the processor is operative in the decode/display mode to display the current temperature of any temperature station in the comparatively large "active" location field and the daily high and low temperatures in the corresponding high and low temperature fields in response to operator input station selection.

16. The multi-station RF telemetry and alarm system of claim 12, wherein in said alarm set mode, the processor is operative to configure the display with alarm min and alarm max fields and with a station alarm set field, and is operative in response to operator input station selection, in response to operator input alarm min and max values selection and in response to operator input alarm arming to set min and max temperature bounds for each station selected and armed.

17. The multi-station RF telemetry and alarm system of claim 16, wherein said display includes a comparatively-large "active" location field and comparatively-smaller temperature station fields, and said processor is operative in alarm set mode to display all stations that have had alarm min and max values set simultaneously in said temperature station fields and is operative in response to operator input station selection to display a selected station in the "active" location field.

18. The multi-station RF telemetry and alarm system of claim 11, wherein in said alarm announce mode, the display is configured with an alarm announce field, and the processor is operative (1) to display a location where an active alarm condition exists in said alarm announce field, (2) to provide an alarm signal indication, and (3) is operative in response to operator alarm dis-arm input to clear the alarm condition for each alarm location.

19. The multi-station RF telemetry and alarm system of claim 18, wherein said display is configured with a comparatively-large "active alarm" location field and with comparatively-smaller alarm location fields, and wherein said processor is operative in alarm announce mode to display in corresponding alarm location fields an indication of an alarm condition and to sequentially display in the active alarm field each location where an alarm condition exists in a predetermined order.

20. The multi-station RF telemetry and alarm system of claim 18, wherein the alarm signal is an audible alarm signal.

21. The multi-station RF telemetry and alarm system of claim 18, wherein the alarm signal is a visible alarm signal.

22. The multi-station RF telemetry and alarm system of claim 18, wherein the alarm signal is a remote alarm signal.

23. The multi-station RF telemetry and alarm system of claim 11, further including a remote station coupled via the phone network to said multi-station base station operable to poll the multi-station base station to request weather information therefrom over the phone network.

24. The multi-station RF telemetry and alarm system of claim 9, wherein said selected time is a randomly selected time.

25. A single-channel RF weather monitoring and display system displaying information at one location representative of weather monitored at multiple, other locations remote from said one location, comprising:

a portable, battery-powered and hand-holdable weather station, deployable at each of said remote locations, including a housing; a sensor connected to said housing for measuring a predetermined parameter representative of the weather prevailing in the environ of said sensor at the location where said station may be deployed; an antenna mounted to said housing; and a processor-controlled transmitter mounted in the housing and coupled to said sensor and said antenna repetitively operative (1) to compile a data packet having information representative of station ID and of said weather parameter sensed by said sensor at said location where said station may be deployed, (2) to generate a schedule of at least one transmission times in such a way that the schedule of at least one transmission times does not overlap in time with that of other remote locations where portable, battery-operated and hand-holdable weather stations may be deployed and, in accord therewith, to schedule a time to transmit said data packet, and operative (3) to modulate a predetermined-frequency RF carrier wave to transmit said data packet at said scheduled time to enable at said one location contention-free receipt over said single-channel of data packets transmitted from said multiple, remote locations where portable, battery-powered and hand-holdable weather stations may be deployed.

26. A battery-powered RF weather monitoring and display system, comprising:

a portable, battery-powered and hand-holdable weather station, deployable at a remote location to monitor a predetermined weather parameter and transmit the monitored weather parameter to a remote, battery-powered base weather station for display, including a housing; a sensor connected to said housing for measuring said predetermined parameter representative of the weather prevailing in the environ of said sensor at the location where said portable, battery-powered weather station may be deployed; an antenna mounted to said housing; and a processor-controlled transmitter mounted in the housing and coupled to said sensor and said antenna repetitively operative (1) to compile a data packet having first information representative of station ID, second information representative of said weather parameter sensed by said sensor at said location where said portable, battery-powered and hand-holdable weather station may be deployed, and third information that enables the remote battery-powered base weather station to determine time of next transmission allowing the same to enter battery power conserving sleep mode until that time, and operative (2) to transmit said data packet to said portable, battery-powered base weather station; and a portable, battery-powered base weather station operative in response to receipt of a data packet transmitted by said portable, battery-powered and hand-holdable remote weather station to recover said first information and display said sensed weather parameter, and to recover said third information and go into battery power conserving sleep mode until the time of transmission of the next data packet expected from said portable, battery-powered and hand-holdable remote weather station.

\* \* \* \* \*